United States Patent [19]

Miyoshi et al.

[11] Patent Number: 4,766,511
[45] Date of Patent: Aug. 23, 1988

[54] ANTI-STATIC SURFACE FOR MAGNETIC TAPE CARTRIDGE

[75] Inventors: Takahito Miyoshi; Masaaki Fujiyama, both of Odawara, Japan

[73] Assignee: Fuji Photo Film Co., Ltd., Japan

[21] Appl. No.: 53,504

[22] Filed: May 15, 1987

Related U.S. Application Data

[63] Continuation of Ser. No. 712,980, Mar. 18, 1985, abandoned.

[30] Foreign Application Priority Data

Mar. 30, 1984 [JP] Japan .............................. 59-46330[U]

[51] Int. Cl.$^4$ ............................................. G11B 23/02
[52] U.S. Cl. ..................................... 360/132; 206/387
[58] Field of Search ........................ 360/132, 128–129; 242/197–201; 206/387; 361/214, 212

[56] References Cited

U.S. PATENT DOCUMENTS

| | | | |
|---|---|---|---|
| 4,466,582 | 8/1984 | Shiba | 242/197 |
| 4,563,718 | 1/1986 | Shirako | 360/132 |
| 4,570,197 | 2/1986 | Hakanson et al. | 360/132 |

FOREIGN PATENT DOCUMENTS

0010712  1/1979  Japan .................. 360/132

Primary Examiner—John H. Wolff
Assistant Examiner—David J. Severin
Attorney, Agent, or Firm—Pasquale A. Razzano

[57] ABSTRACT

Anti-static material is bonded to the portions of a magnetic tape cassette which are in close proximity to the magnetic tape when the tape is in motion. The anti-static material prevents a static charge being generated by frictional contact between tape and cassette, and therefore protects the tape from damage and erratic travel speed.

4 Claims, 3 Drawing Sheets

ANTI-STATIC SURFACE FOR MAGNETIC TAPE CARTRIDGE

BACKGROUND OF THE INVENTION

1. Field of the Invention

This invention relates to a magnetic tape cassette such as used in a VTR or the like. This invention particularly relates to the structure of said case.

2. Description of the Prior Art

A magnetic tape cartridge generally consists of a cassette case which houses a pair of reels around which are wound magnetic tape. The cassette is inserted in a VTR or the like and the reels rotated to move the tape past the recording or playback head of the VTR for the recording or playback of voice signals, image signals, and the like. FIG. 1 is a plane view of an example of a conventional magnetic tape cartridge for use in a VTR. The cassette case consists of an upper half and a lower half, both formed of synthetic resin, and the view in the figure is that when the upper half has been removed. Disposed within the lower half of the cassette case 1 is a pair of reels 3a, 3b which are rotatable and around which are wound a magnetic tape 4. One end of the tape 4 is attached to the reel 3a and the other end is guided outside the case by guide pins 5a, 5b, across the front of the case parallel to the outer face portions 1a, 1b from which it is separated by a small space (not more than about 2 mm), feeds back into the case via guide pins 5c, 5d and thence is wound around reel 3b. The friction produced by a spring member 6 pressing the tape against the guide pin 5d keeps the tape taut by preventing any slack or looseness developing in the tape 4. Because the tape thus disposed parallel to the front faces 1a, 1b is exposed to the outside, the upper case 2 (not shown) is provided with an openable cover which covers the front of the case (in the figure, the lower face) to protect the tape against dust and damage.

When a cassette constructed thus is inserted into a VTR set for recording or playback, the reels 3a, 3b are rotated by a motor, transporting the tape 4 at the required speed for said recording or playback. Upon completion of the recording/playback the tape is rewound. Because the rewinding proceeds at a fairly high speed (e.g. 1.5 m/sec), there is a risk that the friction of any contact between the tape and the case will generate static electricity. This will also be the case during fast-forwarding of the tape. If the tape 4 is charged with static electricity, it will stick to the case because the case is made of synthetic resin, thereby hindering such rewinding/fast-forwarding. In particular, with reference to the cassette of FIG. 1, because the tape is separated from the front faces 1a, 1b by only a very small space, there is a strong likelihood that the tape will stick to these faces 1a, 1b. FIG. 2 is an enlarged plane view of the front portion of the cassette of FIG. 1, and FIG. 3 is a cross-section of the front along the arrows A—A. Although the tape 4 usually will run approximately parallel to the front faces 1a, 1b, 2a, 2b and at a small distance c (about 0.5-2 mm) therefrom, the space between the tape and the front faces is set only by the guide pins 5b and 5c, so that in the event that the tape becomes charged with static electricity the tape can easily stick to the front faces. This will require a greater motive force by the motor to transport the tape, or the tape may be unable to be moved, or may be transported while still sticking to the case, damaging the tape and causing the speed of the tape travel to become erratic.

SUMMARY OF THE INVENTION

In the light of the foregoing description and observations of the conventional cassette, it is the object of the present invention to provide a magnetic tape cartridge whereby the tape is prevented from becoming charged and sticking to the case.

The magnetic tape cartridge according to this invention is characterized by the bonding of anti-static material having a corrugated, embossed or similar such surface on those portions of the cassette case surface which are located opposite, and separated by a small space from, the magnetic tape housed in the cassette case when the magnetic tape is being transported. By small space is meant a space not exceeding 2 mm.

In the present invention, those portions of the cassette case which the magnetic tape comes near to when the tape is in motion have bonded thereto anti-static means which has an uneven surface, making it possible to prevent the magnetic tape being drawn onto these portions by static electricity. Moreover, this anti-static means can be manufactured independently of the case, so it is very easy to provide it with an uneven surface, and there is the additional merit that, compared with the conventional case, the cassette case of this invention only has to be made smaller by the thickness of the anti-static means at those portions to which the anti-static means is to be bonded, so the cassette case of the present invention will be almost unchanged from the conventional cassette case.

DESCRIPTION OF THE PREFERRED EMBODIMENTS

Figure 1:
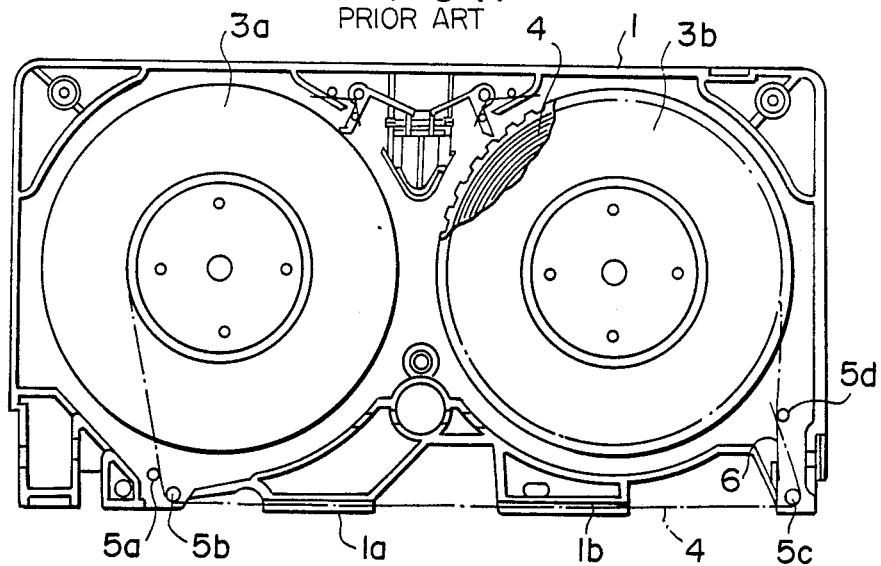
FIG. 1 is a plane view of a conventional magnetic tape cassette with the upper half of the case removed.
Figure 2:
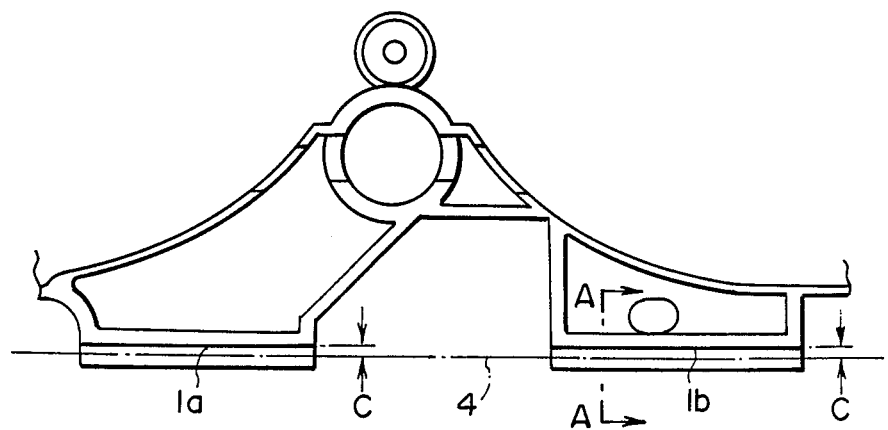
FIG. 2 is an enlarged view of the front portion of the magnetic tape cassette of FIG. 1.
Figure 3:
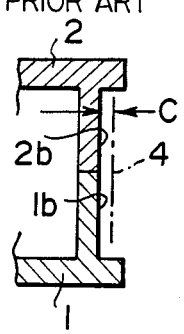
FIG. 3 is a cross-sectional view through the line A—A of the front portion of the cassette of FIG. 2.
Figure 4:
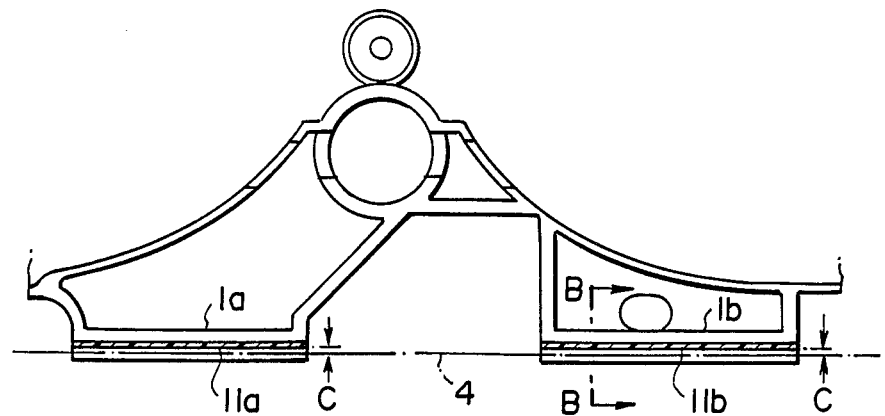
FIG. 4 is a plane view of the front portion of the magnetic tape cassette according to this invention.
Figure 5:
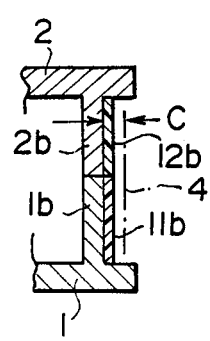
FIG. 5 is a cross-sectional view through the line B—B of the front portion of the cassette of FIG. 4 according to this invention.

The VTR cassette according to this invention is identical to the cassette shown in FIG. 1 except for the structure of the front face. Therefore the description here will be confined to the front face, which is illustrated in FIG. 4. In FIG. 4, anti-static means 11a, 11b are bonded on the front face portions 1a, 1b roughly parallel to magnetic tape 4. The anti-static means 11a, 11b are disposed so that there is a small gap (not more than 2 mm) between the highest point of the surface of the means and the tape 4. Referring to FIG. 5, the case, which is made of synthetic resin (for example polystyrene or ABS), consists of an upper case 2 and a lower case 1 which are fitted together. The anti-static means 11a, 11b, 12a, 12b are bonded to the front face portions 1a, 1b, 2a, 2b of the case halves 1, 2.

Figure 6:
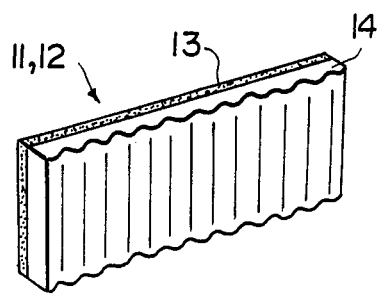
FIG. 6 and FIG. 7 are perspective views of embodiments of the anti-static means.
Figure 7:
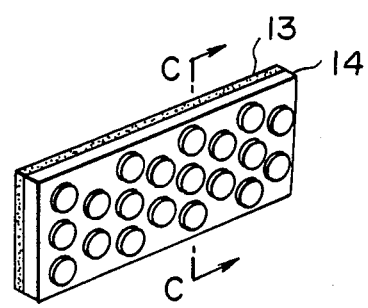
Figure 8:
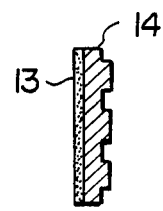
FIG. 8 is a cross-sectional view through the line C—C of the anti-static means of FIG. 7.

The anti-static means 11,12 may consist, as shown in FIG. 6, of a corrugated anti-static layer 14 the reverse side of which is provided with an adhesive tape layer 13, or as shown in FIGS. 7 and 8, may consist of an anti-static layer 14 which has a plurality of raised embossments and is provided on its reverse side with an adhesive layer 13.

Preferably the pitch of such corrugations should be at least 1 mm and that the space between embossments should be at least 1 mm.

The anti-static layer 14 is not limited to a substance with specific properties, but preferably it should have an electrical resistance which is on the low side (for example, not more that $10^8$ ohms); an anti-static layer made of metal or the following type of substance will enhance the anti-static effect. Specifically, it is preferable to use for the anti-static layer carbon, TiO, $SnO_2$ or graphite with a binder of heat-resistant resin such as phenoxy resin or non-saturated polyester resin, and the addition of a polymer such as polyurethane, PVC-acetate copolymer, or nitrocellulose, with a P/B ratio of between 3/97 and 90/10. The anti-static agents listed below are among the ones that may also be added.

(1) Amines (for example, Ethomeen T/12 manufactured by Lion Fat and Oil Co.)
(2) Alkyl ester (for example, Newcal 150 manufactured by Nippon Nyukazai Co., Ltd.)
(3) Alkyl ether (for example, Elimina N manufactured by Marubishi Oil Co., Ltd.)
(4) Alkyl sulfonate (Statexan KI manufactured by Bayer GmbH)
(5) Alkyl phosphate (Elenon No. 19 M manufactured by Dai-ichi Kogyo Seiyaku)
(6) Grade 4 ammonium (Catanac SN manufactured by by American Cyanamide Corp.)
(7) Sorbitan derivative (Sorbon S manufactured by Toho Chemical Industry Co., Ltd.)
(8) Betain (Texnol R2 manufactured by Nippon Nyukazai Co., Ltd.)
(9) Imidazoline (Lipomine LH manufactured by Lion Fat and Oil Co.)

Figure 9:
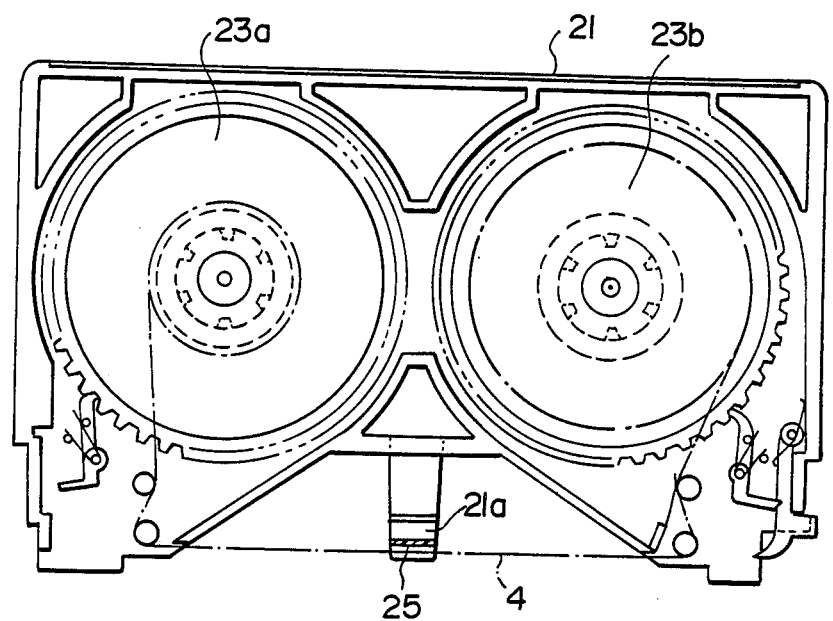
FIG. 9 is a plane view of another embodiment of a magnetic tape cassette according to this invention.

FIG. 9 is a plane view of another embodiment of the magnetic tape cartridge according to this invention, shown with the upper half of the cassette removed. This cassette case 21 is also provided therein with a pair of reels 23a, 23b around which a magnetic tape 4 is wound, and anti-static means 25 is also bonded to the front face 21a roughly parallel to the magnetic tape 4 disposed across the front of the case 21.

The description with reference to the above embodiments has related to the portions of the front face of a magnetic tape cassette which are in opposition to the tape, but the invention is not limited to this, obviously being also applicable to any portion inside the case which the tape runs close to and where there is a risk of the tape being drawn onto the case by static electricity.

From the foregoing it can therefore be understood that in accordance with this invention, just by bonding unevenly surfaced anti-static means to those portions of the cassette case which the magnetic tape is near to during its motion, the tape can be prevented from being drawn against the case, ensuring stable movement of the tape and preventing the tape being damaged. Additionally, fabrication is extremely simple, as all that requires to be done is to bond the anti-static means to a cassette case which is virtually the same as a conventional cassette case.

We claim:

1. A magnetic tape cassette comprising a magnetic tape for recording data such as image signals and voice signals and a cassette case which houses said magnetic tape, said cassette case having a front face portion, said magnetic tape defining a tape path traveling across the front face portion of the cassette, said front face portion being substantially parallel to the tape path, and said cassette case having anti-static means for preventing static charge being generated by frictional contact between the tape and the cassette case; and anti-static means having a plurality of raised embossments bound by adhesive means to the front face portion of the cassette case in close proximity to the magnetic tape when the tape is in motion and spaced apart from the tape.

2. The magnetic tape cassette of claim 1 wherein said anti-static means preferably has an electrical resistance not greater than $10^8$ ohms.

3. The magnetic tape cassette as set forth in claim 1 wherein adjacent embossments are spaced-apart by approximately 1 mm.

4. A magnetic tape cassette comprising a magnetic tape for recording data such as image signals and voice signals and a cassette case which houses said magnetic tape, said cassette case having a front face portion, said magnetic tape defining a tape path traveling across the front face portion of the cassette, said front face portion being substantially parallel to the tape path, and said cassette case having anti-static means for preventing static charge being generated by frictional contact between the tape and the cassette case; said anti-static means being corrugated and bound by adhesive means to the front face portion of the cassette case in close proximity to the magnetic tape when the tape is in motion and spaced apart from the tape.

* * * * *